E. D. NELSON & W. L. BROWN.
HOSE PIPE COUPLING END CONNECTION.
APPLICATION FILED AUG. 13, 1907.
922,805.
Patented May 25, 1909.
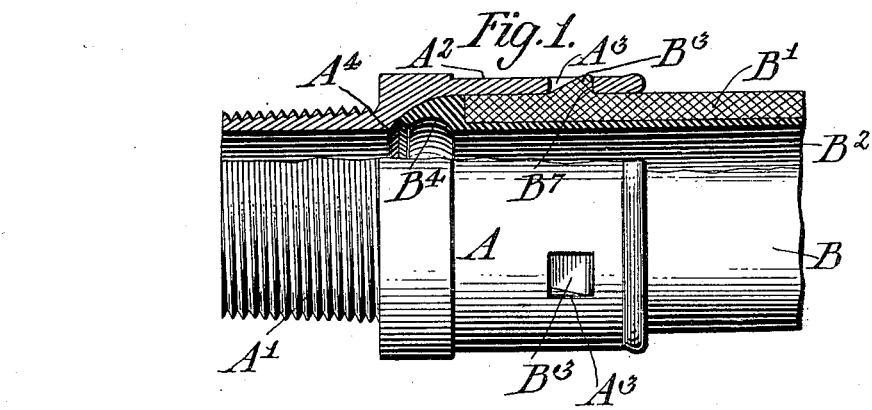
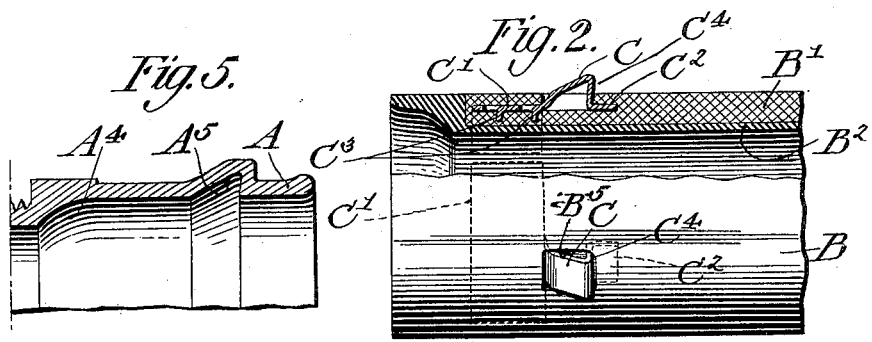
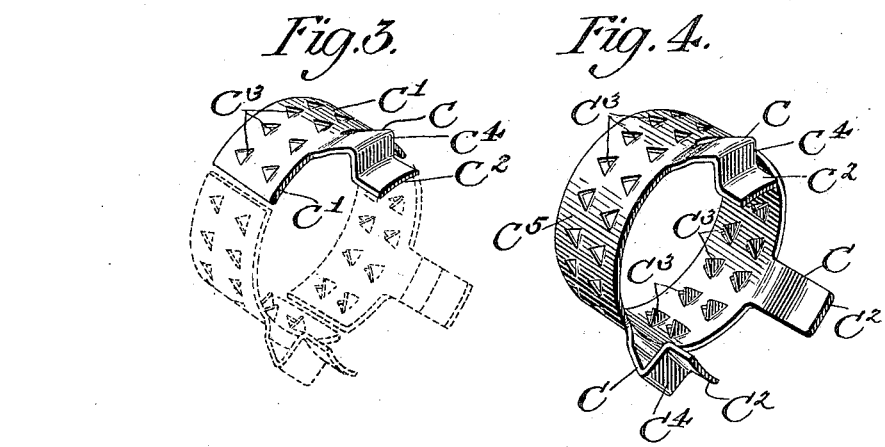
WITNESSES:
INVENTORS:

UNITED STATES PATENT OFFICE.

EDWARD D. NELSON AND WILLIAM L. BROWN, OF ALTOONA, PENNSYLVANIA.

HOSE-PIPE-COUPLING END CONNECTION.

No. 922,805.     Specification of Letters Patent.     Patented May 25, 1909.

Application filed August 13, 1907. Serial No. 388,308.

*To all whom it may concern:*

Be it known that we, EDWARD D. NELSON and WILLIAM L. BROWN, citizens of the United States of America, and both residing in Altoona, in the county of Blair, in the State of Pennsylvania, have invented a certain new and useful Improvement in Hose-Pipe-Coupling End Connections, of which the following is a true and exact description, reference being had to the accompanying drawings, which form a part thereof.

The present invention relates to hose pipes, particularly such as are used for coupling the air and steam pipes of railway cars, and has for its object the provision of improved means for securing the ends of the flexible non-metallic hose sections in the metallic sockets of the metallic coupling ends.

In carrying out our invention we provide locking lugs, projections, or enlargements on the ends of the flexible hose section which are received in a recess or recesses formed in the wall of the coupling end. These projections may be non-metallic and integrally or otherwise connected to the hose section, or they may be formed of metal suitably secured to the hose. As the hose section is put in place in the coupling end, the locking projections are depressed into the body of the flexible hose by the wall of the coupling socket until the projections reach the recesses formed to receive them, whereupon they snap into place in said recesses. The air pressure on the inner wall of the hose assists in preventing the withdrawal of the projections when the hose is in service. The end of the hose beyond the lugs may also be stiffened, as by incorporating a stiffening ring in it to assist in holding the hose in place in the coupling end.

The various features of novelty which characterize our invention are pointed out with particularity in the claims annexed to and forming a part of this specification. For a better understanding of our invention, however, reference may be had to the accompanying drawing and descriptive matter, in which we have illustrated and described forms in which our invention may be embodied.

Of the drawings, Figure 1 is an elevation, partly broken away and in section, of a coupling end and portion of attached hose constructed in accordance with one form of our invention. Fig. 2 is an elevation, partly broken away and in section, of a portion of a hose embodying a modified form of our invention. Fig. 3 is a perspective view of one of the metallic locking parts used in the construction of Fig. 2. Fig. 4 is a perspective view of another form of metallic locking member, and Fig. 5 is a partial sectional elevation illustrating a modified form of the metallic coupling end.

Referring first to the construction shown in Fig. 1, A represents the metallic coupling end, which is provided with the threaded portion A', the hose receiving socket portion $A^2$, and the recess or recesses for the hose locking projections. In the form shown in Fig. 1, there is an individual recess for each locking projection, and this recess is in the form of an aperture $A^3$ extending through the socket wall. In the modification shown in Fig. 5, the various locking projections are received in a single circumferential groove or channel $A^5$. The non-metallic hose section B may be of any usual construction, as with an inner rubber portion or lining $B^2$, and an outer fabric, or fabric and rubber, portion B'. Usually the parts B' and $B^2$ are vulcanized together. The end of the hose section B, which is of a diameter to fit snugly in the socket of the metallic coupling end, has on its outer surface a plurality of locking projections or lugs $B^3$, which in this form of our invention are non-metallic, and are formed integrally with the hose and may be of rubber or fabric. Preferably the rubber portion $B^2$ of the hose is continued to form a flexible lip $B^4$, which, by reason of its elasticity and the air pressure, seals against the curved portion $A^f$ of the socket wall.

In the construction shown in Figs. 2 and 3, the body of the hose B may be the same as that of Fig. 1. The locking projections $B^3$ of the first construction are replaced by metallic projections C. In this form of our invention, the projections C are bent up from sheet metal, each projection being connected to and forming flexible extensions of a curved body portion C'. The body portions C' of the metallic locking parts, and the extensions C² of the projections C, are embedded in the fabric portion B' of the hose, the hose having portions removed as indicated at B⁵ to accommodate the locking projections C. To assist in holding the locking parts C in place, the body portions C' are provided with tongues or internal projections C³, as shown, which are embedded in the hose structure. The metallic coupling end for the hose construction of Figs. 2 and 3 may be like that of Fig. 1.

It will be observed that in forms of our invention shown in Figs. 1, 2, and 3, the locking projections proper are separated sufficiently to permit their ready depression into the body of the hose when the latter is being entered in the metallic end piece. To facilitate this, the outer surfaces of the projections are inclined toward the outer end of the hose, while the edges B⁷ and C⁴ of the projections are radial. When it is desired to remove the hose from the coupling end, this may be accomplished by suitable means acting externally on the projections B³ or C. The removal is facilitated when the socket is provided with the apertures A³, through which the projections may be acted upon.

In the constructions of Figs. 2 and 3, the body portion C' preferably unite to form a practically complete cylinder or stiffening ring for the end of the hose section, which is thus made comparatively unyielding. The flexibility of the projections C permit them to be readily depressed into the normal hose outline when necessary to insert the hose end in or remove it from the coupling end.

The construction shown in Fig. 4 is like that of Figs. 2 and 3 except for the fact that the projections or locking parts C extend from a single continuous annular body C⁵ which may be embedded in the hose end. The continuous stiffening ring of Fig. 4, or the broken stiffening ring formed by the body portions C' of Figs. 2 and 3, assist materially in preventing accidental withdrawal of the hose from the metallic coupling end. Instead of embedding the stiffening ring portion carrying the flexible parts C in the body of the hose this portion may surround the hose.

Having now described our invention, what we claim as new, and desire to secure by Letters Patent, is:

1. A flexible non-metallic hose pipe, having spaced apart locking projections at its ends, which extend from the outer surface of the hose in its normal condition, but may be depressed into the hose to permit the hose to be entered in the socket of a rigid end member, in combination with a rigid end member having a socket receiving the end of the hose pipe, and recessed to receive the locking projections.

2. A flexible non-metallic hose pipe, having spaced apart locking projections at its ends, which extend from the outer surface of the hose in its normal condition, but may be depressed into the hose to permit the hose to be entered in the socket of a rigid end member, the hose end beyond the projections being stiffened, in combination with a rigid end member having a socket receiving the end of the hose pipe, and provided with recesses into which the locking projections may enter.

3. A flexible non-metallic hose pipe, having spaced apart locking projections at its ends, which extend from the outer surface of the hose in its normal condition, but may be depressed into the hose to permit the hose to be entered in the socket of a rigid end member, in combination with a rigid end member having a socket receiving the end of the hose pipe, and provided with recesses into which the locking projections may enter, said projections having their outer surfaces inclined toward the outer end of the hose to facilitate the entrance of the hose in the end member, and having their edges remote from the end of the hose substantially radial to prevent subsequent accidental displacement.

4. A flexible non-metallic hose pipe, having spaced apart locking projections at its ends, which extend from the outer surface of the hose in its normal condition, but may be depressed into the hose to permit the hose to be entered in the socket of a rigid end member, in combination with a rigid end member having a socket receiving the end of the hose pipe, and provided with recesses into which the locking projections may enter, said recesses extending through the wall of the end member to permit the depression of the projections by external means when it is subsequently desired to remove the hose.

5. A flexible non-metallic hose pipe, having spaced apart metallic locking parts secured to it at its end, which extend from the outer surface of the hose in its normal condition, but may be depressed into the hose to permit the hose to be entered in the socket of a rigid end member, in combination with a rigid end member having a socket receiving the end of the hose pipe, and provided with recesses into which the locking parts may enter.

6. A flexible non-metallic hose pipe, having spaced apart metallic locking parts partially embedded in it at its end, which extend from the outer surface of the hose in its normal condition, but may be depressed into the hose to permit the hose to be entered in the socket of a rigid end member, in combination with a rigid end member having a socket receiving the end of the hose pipe, and provided with recesses into which the locking parts may enter.

7. A flexible non-metallic hose pipe, having its end stiffened by a metallic stiffening ring, from which extend flexible locking parts which normally project from the outer surface of the hose body, but may be depressed to permit the hose to be entered into the socket of a rigid end member, in combination with a rigid end member having a socket receiving the end of the hose pipe, and provided with recesses into which the locking parts may extend when the hose is entered in the socket.

EDWARD D. NELSON.
WILLIAM L. BROWN.

Witnesses:
J. B. COWEN,
W. J. HAMOR.